US011133002B2

(12) United States Patent
Miller et al.

(10) Patent No.: US 11,133,002 B2
(45) Date of Patent: Sep. 28, 2021

(54) SYSTEMS AND METHODS OF REAL-TIME VEHICLE-BASED ANALYTICS AND USES THEREOF

(71) Applicant: Ford Global Technologies, LLC, Dearborn, MI (US)

(72) Inventors: Jason Miller, Woodhaven, MI (US); Karl Nathan Clark, Belleville, MI (US); Brandon Johnson, Southfield, MI (US); Vijayababu Jayaraman, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 16/247,137

(22) Filed: Jan. 14, 2019

(65) Prior Publication Data

US 2020/0227036 A1 Jul. 16, 2020

(51) Int. Cl.
*G10L 15/22* (2006.01)
*G06K 9/00* (2006.01)
*G10L 15/18* (2013.01)
*G10L 25/63* (2013.01)
*G10L 15/30* (2013.01)

(52) U.S. Cl.
CPC .......... *G10L 15/22* (2013.01); *G06K 9/00302* (2013.01); *G10L 15/1815* (2013.01); *G10L 15/30* (2013.01); *G10L 25/63* (2013.01); *G10L 2015/223* (2013.01); *G10L 2015/228* (2013.01)

(58) Field of Classification Search
CPC ..... G10L 15/22; G10L 15/1815; G10L 15/30; G10L 25/63; G10L 2015/223; G10L 2015/228; G06K 9/00302
See application file for complete search history.

(56) References Cited

U.S. PATENT DOCUMENTS 9,805,601 B1 * 10/2017 Fields .............. G08G 1/096725
10,445,758 B1 * 10/2019 Bryer ..................... G06Q 40/08
10,482,333 B1 * 11/2019 el Kaliouby ....... G06K 9/00335
(Continued)

FOREIGN PATENT DOCUMENTS

CN 107340773 A 11/2017

OTHER PUBLICATIONS

McManus, A., "Driver Emotion Recognition and Real Time Facial Analysis for the Automotive Industry," Affectiva, Apr. 11, 2017 (8 Pages). Retrieved from https://blog.affectiva.com/driver-emotion-recognition-and-real-time-facial-analysis-for-the-automotive-industry.

*Primary Examiner* — Fariba Sirjani
(74) *Attorney, Agent, or Firm* — Michael Spenner; Eversheds Sutherland (US) LLP (57) ABSTRACT

Systems and methods of real-time vehicle-based analytics are provided herein. An example method includes collecting at least one of images, video, or audio of a user when operating a vehicle; analyzing the at least one of the images, video, or audio to determine an emotion or sentiment of the user when interacting with one or more features of the vehicle; identifying user actions that precede a point in time where the emotion or sentiment of the user was detected, wherein the user actions relate to the one or more vehicle features; classifying at least one of the user actions and the one or more vehicle features with the emotion or sentiment; and storing the user actions, the one or more vehicle features, and the emotion or sentiment.

20 Claims, 3 Drawing Sheets

(56) References Cited

U.S. PATENT DOCUMENTS

| | | | |
|---|---|---|---|
| 2012/0143391 A1* | 6/2012 | Gee | B60K 37/06 |
| | | | 701/1 |
| 2013/0132931 A1* | 5/2013 | Bruns | G06F 9/451 |
| | | | 717/124 |
| 2015/0053066 A1* | 2/2015 | Hampiholi | G10H 1/0008 |
| | | | 84/602 |
| 2015/0254447 A1* | 9/2015 | Leuthardt | G06Q 30/0271 |
| | | | 705/14.67 |
| 2015/0309512 A1* | 10/2015 | Cudak | B60W 30/00 |
| | | | 701/23 |
| 2016/0316237 A1* | 10/2016 | Couleaud | H04N 21/25883 |
| 2017/0011210 A1* | 1/2017 | Cheong | G06F 21/32 |
| 2017/0336791 A1* | 11/2017 | Huai | G05D 1/0088 |
| 2018/0075309 A1* | 3/2018 | Sathyanarayana | G06N 7/005 |
| 2019/0161088 A1* | 5/2019 | Goto | G06K 9/00315 |
| 2019/0355351 A1* | 11/2019 | Kim | B60W 50/087 |

* cited by examiner

SYSTEMS AND METHODS OF REAL-TIME VEHICLE-BASED ANALYTICS AND USES THEREOF

TECHNICAL FIELD

The present disclosure relates to systems and methods that provide for real-time vehicle-based analytics relating to vehicle operations and user interactions with a vehicle, as well as automatic feature updating for the vehicle.

BACKGROUND

Users, such as drivers or passengers in a vehicle, may engage in varied types of interactions with vehicle systems and features. For example, a user can utilize navigation functions, entertainment features, climate control, and so forth available in the vehicle. The user also can interact with various physical components such as electrical and/or mechanical controls of the vehicle such as steering, braking, throttle, and so forth. While users are often surveyed regarding their opinions of vehicle attributes or parameters, these surveys are often conducted post hoc with respect to usage of vehicle features. Also, these surveys rely on expressed opinions and potentially faulty recollection of the users, and thus are often of limited value. For example, a survey may not elicit answers to questions needed in order to assess the true opinions of the users.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Generally described, the present disclosure is directed to, in some embodiments, systems and methods that provide real-time vehicle-based analytics relating to vehicle operations and user interactions with a vehicle. In some embodiments, the systems and methods disclosed herein utilize a plurality of systems or components to collect user actions/interactions with vehicle features, as well as user data such as audio and/or video. These audio and/or video are evaluated for facial and/or verbal expressions of the user. The facial and/or verbal expressions of the user can be analyzed to detect user emotions and/or sentiments, such as happiness, sadness, anger, elation, frustration, and so forth. These systems and methods also continually or periodically track user actions/interactions with vehicle features/components and correlate this information to any detected emotions and/or sentiments. This allows the systems and methods to identify user interactions that provoked an emotion or sentiment by the user. When these emotions or sentiments are negative in nature, their correlated user interactions are identified as potential areas for vehicle improvement by vehicle designers.

In some embodiments, the present disclosure utilizes emotion detection, and certain embodiments can utilize real-time emotion detection by analyzing audio and/or video (e.g., images) captured using various means. For example, a video camera and/or a microphone of a voice command system in a vehicle can be used to collect audio and/or video that are then subjected to emotion detection analyses.

In one or more embodiments, these systems and methods can be utilized to identify specific user interactions with the vehicle. In various embodiments the user actions/interactions and corresponding emotions and/or sentiments are detected. That is, when the systems and methods detect emotions and/or sentiments expressed by a user, the systems and methods then analyze the user actions in order to identify one or more vehicle features that prompted or contributed to the emotions and/or sentiments. Stated differently, the systems and methods herein can analyze images, video, or audio to determine an emotion or sentiment of the user when interacting with one or more features of the vehicle. These systems and methods identify user actions that coincide with the emotion or sentiment of the user, and the user actions relate to the one or more vehicle features. In some embodiments, the user actions coincide with an emotion or sentiment when they are sufficiently contemporaneous with one another. That is, if the user is interacting with features of the vehicle, and the user has an emotional reaction within a given time frame after interacting with the features, it is plausible to link the features of the vehicle with the user's emotional reaction.

In various embodiments, the user actions can be related to the use of a vehicle human machine interface (HMI). Analysis of these user actions can be used to determine customer satisfaction and identify areas for improvement with respect to the HMI.

In some embodiments, these systems and methods provide for detection and classification of emotion based on voice commands and association with the determined activity such as changing a radio station, setting a navigation destination, calling someone, and so forth. In some instances, these processes include analyzing pre-action and/or post-action audio with customer consent when performing a specific HMI action such as navigating through options on a touchscreen display so as to gauge a level of satisfaction or dissatisfaction of the user with the action.

Some embodiments capture and analyze pre-action and/or post-action video or still photos of the driver or passenger when performing any HMI action such as navigating through options on the touchscreen or when using voice commands. These analyses are used to gauge a level of satisfaction or dissatisfaction of the user or passenger with the action.

In various embodiments, videos and/or pictures can automatically be analyzed for a time period before and after each HMI interaction and trigger the generation of logs when a detected emotion indicates a change to frustration/sadness/anger or to happiness/surprise. In other embodiments, logs can be generated continually and then used in a post-action manner.

In other examples, voice commands resulting in frustration may be saved for offline analysis and stored with future HMI button presses that follow in order to better determine specifically what action the user was attempting to perform.

In some embodiments, data may be anonymized to protect privacy, while still retaining key vehicle attributes such as year, model, and relevant option content and software/hardware versions.

These systems and methods allow for a more robust and empirical understanding of the actual user experience by determining what actions are actually triggering happiness, surprise and delight, or perhaps more importantly what is triggering anger and frustration.

In various embodiments, user experience data can be uploaded back to the cloud, allowing engineers to better understand what voice commands and what HMI actions are the most frustrating to the customer. Changes to these features can then be developed, and pushed to the vehicle via an over-the-air (OTA) update, where the customer experience can be further analyzed.

In addition to analyzing user HMI actions and their associated emotions, the systems and methods herein can be utilized to analyze user data (video/audio) to assess user emotion(s) and to link those emotion(s) to other user actions related to other types of vehicle interactions. For example, the systems and methods herein link user emotions to vehicle interactions such as braking, acceleration, blind spot identification, and other mechanical and/or electrical components of the vehicle such as stick or paddle shifters, turn signals, windshield wipers, headlights, and so forth. These and other aspects and advantages of the present disclosure are described in greater detail herein with reference to the collective drawings.

Illustrative Architecture

Figure 1:
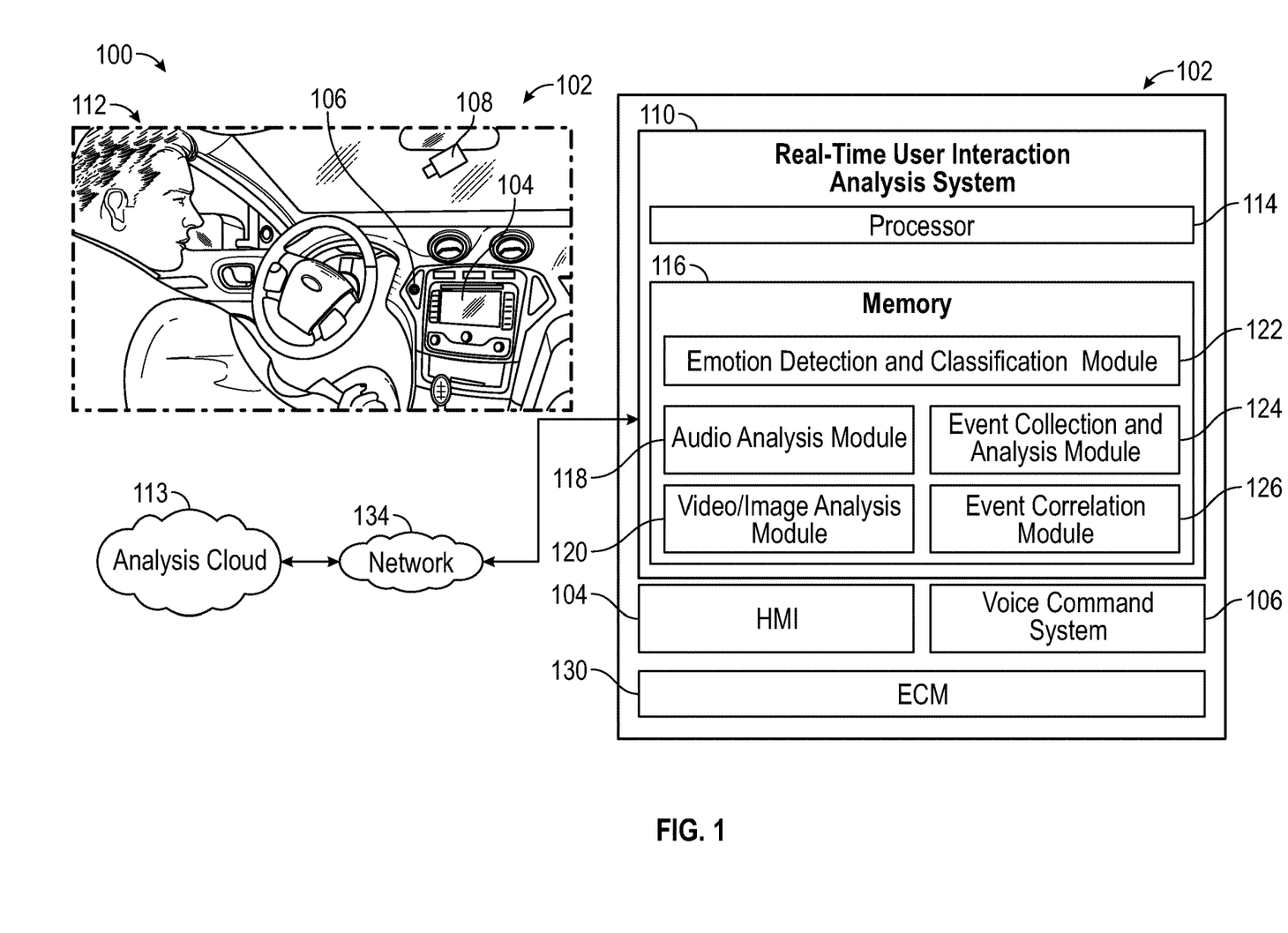
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a vehicle 102 having a human machine interface (HMI) 104, a voice command system 106, a camera 108, and a real-time user interaction analysis system (system 110). The system 110 is illustrated schematically along with relevant components of the vehicle 102, all of which are disclosed in greater detail infra. At least one user 112 is present within the vehicle 102, and vehicle interactions are occurring as the user 112 performs user actions within the vehicle 102. To be sure, the user 112 is interacting with vehicle features, such as the HMI 104. In some embodiments, an analysis cloud 113 is implemented to perform various aspects of the present disclosure and will also be discussed in greater detail below.

In some embodiments, the HMI 104 can include any system within the vehicle 102 that receives interactive input from the user 112. For example, the HMI 104 could include an infotainment system as illustrated, a heads-up display, a navigation cluster, a climate control system, or other similar interface within the vehicle 102. In various embodiments, the camera 108 can include any device capable of recording images or video of the user 112. In some embodiments, more cameras can be utilized than the single camera illustrated.

Similarly, the voice command system 106 can include any device capable of receiving audio from the user 112 such as spoken words, phrases, and/or sounds. In some embodiments, the voice command system 106 is capable of receiving and interpreting natural language commands of the user 112, but other sounds made by the user 112 can also be received and processed such as sighs, screams, and so forth. In various embodiments, the voice command system 106 continually records audio within the vehicle 102.

According to some embodiments, the voice command system 106 is specifically configured to perform detailed analyses of recorded audio of users within the vehicle 102 to determine emotions from the recorded audio. In these embodiments, the voice command system 106 is configured to analyze this audio data to identify tonal changes or patterns in voice patterns that are indicative of emotions such as happiness, frustration, anger, and so forth. In some instances, these data are analyzed using machine learning or artificial intelligence which matches captured audio from the vehicle 102 to modeled audio that is indicative of emotions. In sum, the voice command system 106 can be trained on specific audio patterns and identify similar audio patterns in the recorded audio.

Collectively, the camera 108 and the voice command system 106 provide a plurality of inputs to the system 110 that can be analyzed for emotion and/or sentiment of the user 112.

Broadly described, the system 110 is a specific purpose computing system that can comprise a processor 114 and a memory 116. In general, the processor 114 executes instructions in the memory 116 to provide functionalities related to user emotion or sentiment detection, and identification of user actions correlated to the user emotion or sentiment detection, as well as vehicle features associated with the user actions. In some embodiments, the user emotion or sentiment is first detected by the system 110 from audio and/or video. In various embodiments, the audio and/or video analyzed by the system 110 are associated with time information.

The system 110 can then evaluate user interactions tracked by various components of the vehicle 102. For example, the HMI 104 can track user actions and record these user actions with respect to time. Thus, when an emotion and/or sentiment of interest is detected by the system 110, relevant user interactions can be identified based on a correspondence in time. That is, because both the identified emotions and user actions are tracked with respect to time, user actions occurring contemporaneously with the detected emotions can be inferred to be the cause of the emotions of the user. In some embodiments, user actions both immediately prior to, and immediately after an emotion is expressed by a user, are relevant and identified for further analysis.

In some embodiments, the system 110 is broadly configured to analyze images, video, and/or audio to determine an emotion or sentiment of the user when interacting with one or more features of the vehicle. The system 110 can also identify user actions that precede a point in time where the emotion or sentiment of the user was detected. To be sure, the user actions relate to the one or more vehicle features. The system 110 can then classify at least one of the user actions and one or more vehicle features with the emotion or sentiment, as well as store the user actions, the one or more vehicle features, and the emotion or sentiment.

In more detail, the memory 116 of the system 110 is configured with specific modules that collectively provide the functionalities disclosed herein. For example, the memory 116 may comprise an audio analysis module 118, a video/image analysis module 120, an emotion detection and classification module 122, an event collection and analysis module 124, and an event correlation module 126. To be sure, these modules can be combined together in some instances. For example, the emotion detection and classification module 122, the event collection and analysis module 124, and the event correlation module 126 could be combined into a single module.

In various embodiments, the processor 114 can cause the voice command system 106 to collect audible data from within the vehicle 102 using the audio analysis module 118. In some embodiments, the processor 114 can cause the camera 108 to collect image or video data from within the vehicle 102 using the video/image analysis module 120. In one or more embodiments, video and/or audio data are collected from the user 112 with explicit user permission. According to some embodiments, the video and/or audio data are collected in a continuous manner when the user 112 is present in the vehicle 102.

As noted above, the audio and/or video can be captured and time-stamped. In some instances, the audio and/or video may be stored in the memory 116 for analysis. Some embodiments utilize temporary cache storage rather than long-term or permanent storage. In other instances, the audio and/or video can be transmitted to the analysis cloud 113 for processing as will be discussed in greater detail infra. In other embodiments, the audio and/or video data are evaluated by the system 110 on-the-fly or in real-time. Also, corresponding user actions and vehicle features implicated in the user actions are also identified in real-time in some instances. An example real-time method is illustrated and described with respect to FIG. 3.

In one or more embodiments, the emotion detection and classification module 122 can be executed to evaluate the audio and/or video data for emotions expressed by the user 112. With regard to the audio data, the emotion detection and classification module 122 can utilize any suitable process for evaluating the audio data for emotions. This can include using natural language processing to identify keywords or phrases that are indicative of an emotion. For example, if the user 112 speaks the phrase "wow, this program is just terrible," the emotion detection and classification module 122 can identify the word terrible and infer that the user 112 is displeased. The word program may also be used to identify that the emotion relates to an application and not hardware.

With respect to video, the emotion detection and classification module 122 can evaluate video or images obtained of a face of the user 112 and utilize facial recognition to identify emotive facial expressions of the user 112. This video data can be used independently or cooperatively with the audio data. In some embodiments, one type of data can be used as a check or verification of another type of data. In this example, analysis of the video indicates that the user 112 has a displeased facial expression at the same time the phrase "wow, this program is just terrible" was spoken. Thus, the video data confirms the emotion inferred from the audio data.

As audio and/or video data are collected, the event collection and analysis module 124 can be used to track and time-stamp user actions occurring within the vehicle 102. In some embodiments, these user actions include interactions with the HMI 104. In other instances, the user actions occur with respect to other vehicle features such as throttle, braking, signaling, and so forth. Thus, in order to track these user actions, the event collection and analysis module 124 can communicate with other control modules of the vehicle 102 that track such data. For example, the event collection and analysis module 124 can communicate with an electronic control module (ECM) 130 of the vehicle 102 that senses or mediates user features such as throttle, braking, signaling, and so forth.

As with other data such as the audio/video data, the user action and/or interaction data can be processed in real-time. In other embodiments, the user action and/or interaction data can be time-stamped and stored for later analysis.

Once an emotion has been identified and classified by the emotion detection and classification module 122 and user actions have been identified by the event collection and analysis module 124 based on temporal correspondence, the event correlation module 126 is executed by the processor 114. In some embodiments, the event correlation module 126 can identify user actions and corresponding vehicle features correlated to the identified emotion. For example, when the audio and/or video data indicate that the user 112 is displeased, the event correlation module 126 can search for user actions that were performed by the user 112 immediately prior to the emotion expressed by the user 112. In one example use case, the user actions are performed relative to the HMI 104. Thus, if the user 112 is using the HMI 104 at the same time the user expresses displeasure, the event correlation module 126 can identify that the user actions were taken relative to something occurring on the HMI 104. In one example, the user 112 is attempting to utilize a navigation program provided through the HMI 104 immediately prior to the user expressing displeasure. Again, these time correlations are made possible by tracking user actions within the vehicle 102 with respect to time. In this example, the user 112 was utilizing the navigation program provided through the HMI 104, as identified from analysis of the user data collected by the event collection and analysis module 124.

The system 110 can store these correlated data together for purposes of reporting. For example, the system 110 stores the emotions/sentiments in combination with the user actions and vehicle features that were identified as being associated with the emotions/sentiments. In one embodiment, a log file of tracking user actions relative to vehicle features can be modified or augmented with information that is indicative of emotions/sentiments. In one example use case, a log file storing user actions with respect to the HMI 104 can be augmented with metadata. In this example, a user is interacting with a program displayed on the HMI 104. As the user interacts with this vehicle feature, a log file is created that tracks events such as when the user opens the program, what input is received during the execution of the program, and program behavior, just to name a few. If a user action regarding opening or launching the program is associated with a negative emotion, the log file can be augmented with metadata that indicates that the user action was linked to a negative emotion.

As noted above, the functionalities of the system 110 related to processing audio and/or video for emotion or sentiment can be implemented through the analysis cloud 113. That is, the analysis cloud 113 can be implemented with the functionalities disclosed above with respect to the emotion detection and classification module 122, the event collection and analysis module 124, and the event correlation module 126. In these embodiments, the system 110 can retain the ability to receive audio and/or video data. The system 110 can then transmit this data to the analysis cloud 113 for analysis and classification over a network 134. In general, the network 134 allows for components within the architecture 100 to communicate with one another. The network 134 may include any one or a combination of multiple different types of networks, such as cable networks, the Internet, cellular networks, wireless networks, and other private and/or public networks. In some instances, the network 134 may include cellular, Wi-Fi, or Wi-Fi direct.

In various embodiments, engineers can utilize these augmented log files to determine improvements or changes to features of the vehicle 102. As noted throughout, these log files can be anonymized to protect the identity of a user.

When the changes occur within software modules of the vehicle 102, the improvements can be pushed to the vehicle 102 over the network 134 for installation. In the example above, changes to the program that fix a problem with the program can be pushed to the vehicle 102. The program can then be automatically updated. Thus, in some embodiments, the system 110 is configured to directly or indirectly update any firmware and/or hardware of the vehicle in response to receiving an update based on the actions and the one or more vehicle features that were classified with the emotion or sentiment. In one example use case, if the user is found to have a negative emotion in response to using a navigation program, a vehicle designer may identify that the user was displeased with a functionality of the navigation program that produced inaccurate navigation. An update to the navigation program is then created and pushed to the vehicle. The system 110 can update the navigation program in an automated manner that is transparent to the user.

Illustrative Methods and Operations

Figure 2:
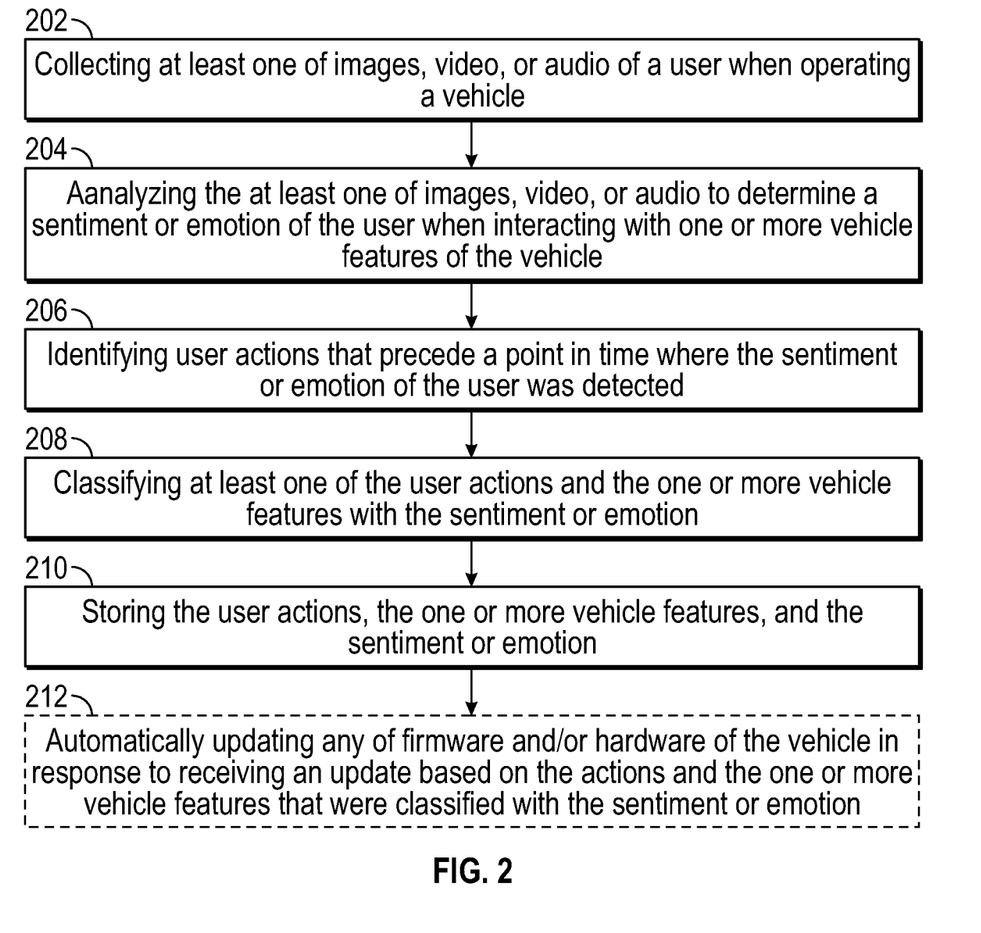
FIG. 2 a flowchart of an example method of the present disclosure.

The following descriptions provide additional details on function and methodological aspects of the present disclosure provided through the architectures and/or systems disclosed above. FIG. 2 is a flowchart of an example method of the present disclosure. The method generally comprises a step 202 of collecting at least one of images, video, or audio of a user when operating a vehicle. As noted above, the collection of audio and/or images can be accomplished using an onboard camera and/or voice command system. In another example, the audio and/or video (e.g., images) can be obtained from a mobile device of a passenger within the vehicle (which can include the user's mobile device or the mobile device of another individual in the vehicle). Once audio and/or images have been collected, the method includes a step 204 of analyzing the at least one of images, video, or audio to determine an emotion or sentiment of the user when interacting with one or more vehicle features of the vehicle. To be sure, this can include identifying keywords or phrases that indicate emotion, as well as decibel level changes or other audible sounds produced by a user such as a gasp or a scream. Facial recognition can be used to identify facial expressions that are indicative of emotions.

In one embodiment, analyzing the images, video, or audio further comprises continually recording and/or analyzing spoken words of the user and continually obtaining and/or analyzing video of the user's face. In some instances, analyzing the at least one of images, video, or audio further comprises any of evaluating the spoken words for keywords or phrases that are indicative of a positive or negative emotion related to the one or more vehicle features and/or applying facial recognition to determine facial expressions in the video that are indicative of a positive or negative emotion related to the one or more vehicle features.

In some embodiments, the method includes a step 206 of identifying user actions that precede a point in time where the emotion or sentiment of the user was detected. This can include identifying information in a log file based on a time frame that was identified in the audio and/or video. For example, if audio is associated with a time-stamp, user actions that precede this time-stamp (e.g., point in time) can be determined. Again, the user actions can comprise user input provided into a human machine interface of the vehicle or user utilization of a physical component of the vehicle. For example, the user may be utilizing a mirror control system or a climate control system of the vehicle.

When the method is performed in real-time or near-real-time (such as in the method of FIG. 3), this process need not strictly rely on time-stamps. However, when it has been determined that an emotion or sentiment has been detected, any user actions preceding this emotion or sentiment can be identified for a time frame that is prior to the emotion. For example, the method can include reviewing user actions that precede the emotion or sentiment by thirty seconds. Time frames other than thirty seconds can also be utilized. Thus, when an emotion is expressed by the user, user actions occurring anywhere in the vehicle are analyzed for a time frame that precedes the emotion. As noted throughout, the user actions relate to one or more vehicle features.

Next, the method includes a step 208 of classifying at least one of the user actions and the one or more vehicle features with the emotion or sentiment. Next, the method can include a step 210 of storing the user actions, the one or more vehicle features, and the emotion or sentiment.

In some embodiments, the method can include an optional step 212 of automatically updating any of firmware and/or hardware of the vehicle in response to receiving an update based on the actions and the one or more vehicle features that were classified with the emotion or sentiment. As noted above, these updates can be prepared by vehicle engineers and/or other vehicle designers and can be pushed to the vehicle over a network connection.

Figure 3:
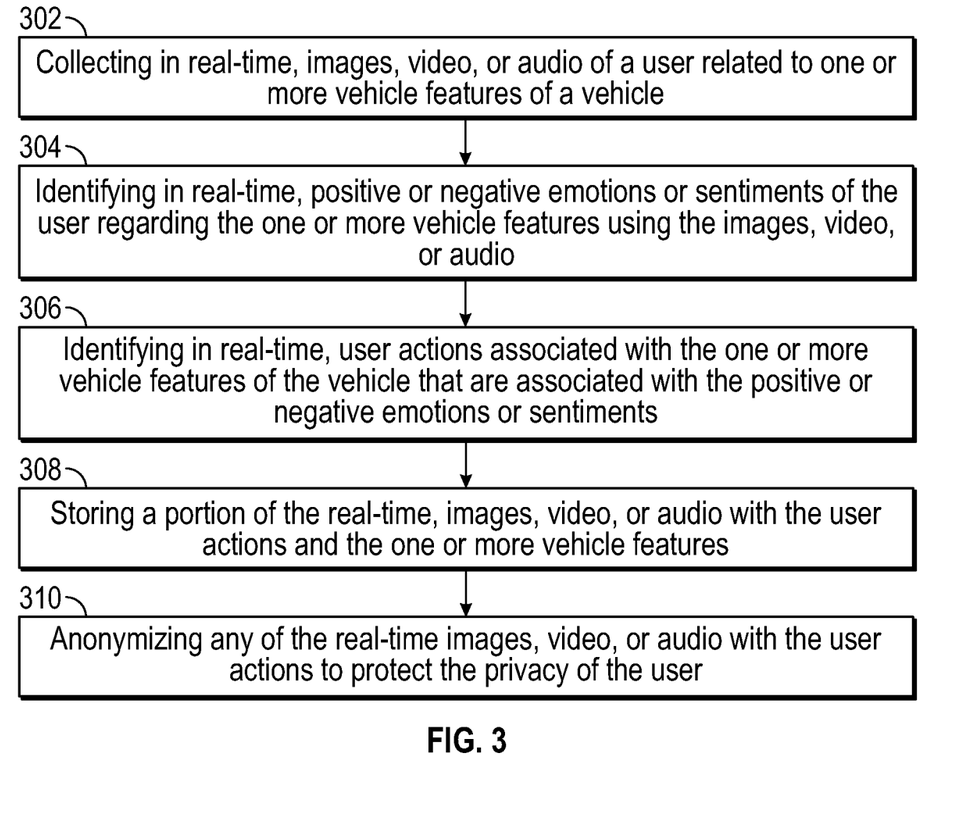
FIG. 3 is a flowchart of an example method of the present disclosure.

FIG. 3 illustrates another example method of the present disclosure. The method of FIG. 3 is associated with a real-time or near-real-time implementation. The method can comprise a step 302 of collecting in real-time, images, video, or audio of a user related to one or more vehicle features of a vehicle. Next, the method includes a step 304 of identifying in real-time, positive or negative emotions or sentiments of the user regarding the one or more vehicle features using the images, video, or audio.

In various embodiments, the method can include a step 306 of identifying in real-time, user actions associated with the one or more vehicle features of the vehicle that are associated with the positive or negative emotions or sentiments, as well as a step 308 of storing a portion of the real-time images, video, or audio with the user actions and the one or more vehicle features. As noted above, user actions occurring within a time frame that immediately precedes the identified emotion can be analyzed.

To be sure, the method can include classifying voice commands from the collected audio as being associated with a positive or negative emotion. Additionally, when the user action is associated with a negative emotion or sentiment, the user experience is flagged for review and improvement.

In various embodiments, the method can include a step 310 of anonymizing any of the real-time images, video, or audio with the user actions to protect the privacy of the user. Thus, the data that is stored and/or transferred can be anonymized while still retaining key vehicle attributes such as year, model, and relevant option content and software/hardware versions.

EXAMPLES

In some instances, the following examples may be implemented together or separately by the systems and methods described herein.

Example 1 may include a method, comprising: receiving, by a computer comprising at least one processor in communication with at least one memory, at least one image, video, or audio of a user when operating a vehicle; determining, by the computer and based on the at least one image, video, or audio, an emotion or sentiment of the user when interacting with one or more vehicle features; determining, by the computer, user actions that precede a point in time where the emotion or sentiment of the user was detected, wherein the user actions relate to the one or more vehicle features; and determining, by the computer, an association between at least one of the user actions and the one or more vehicle features with the emotion or sentiment.

Example 2 may include the method according to example 1, further comprising storing the user actions, the one or more vehicle features, and the emotion or sentiment.

Example 3 may include the method according to example 1 and/or some other example herein, wherein collecting at least one image, video, or audio comprises continually recording spoken words of the user and continually obtaining video of the user.

Example 4 may include the method according to example 3 and/or some other example herein, wherein analyzing the at least one image, video, or audio comprises any of: evaluating the spoken words for keywords or phrases that are indicative of a positive or negative emotion related to the one or more vehicle features; or applying facial recognition to determine facial expressions in the video that are indicative of a positive or negative emotion related to the one or more vehicle features.

Example 5 may include the method according to example 1 and/or some other example herein, wherein the user actions comprise any of user input provided into a human machine interface of the vehicle or user utilization of a physical component of the vehicle.

Example 6 may include the method according to example 1 and/or some other example herein, further comprising identifying the user actions that are subsequent to the point in time where the emotion or sentiment of the user was detected.

Example 7 may include the method according to example 6 and/or some other example herein, further comprising storing the user actions that are subsequent to the point in time where the emotion or sentiment of the user was detected.

Example 8 may include a method, comprising: collecting in real-time, images, video, or audio of a user related to one or more features of a vehicle; identifying in real-time, positive or negative emotions or sentiments of the user regarding the one or more vehicle features using the images, video, or audio; identifying in real-time, user actions associated with the one or more vehicle features of the vehicle that are associated with the positive or negative emotions or sentiments; and storing a portion of the real-time images, video, or audio with the user actions and the one or more vehicle features.

Example 9 may include the method according to example 8, further comprising classifying voice commands from the collected audio as being associated with a positive or negative emotion.

Example 10 may include the method according to example 9 and/or some other example herein, wherein when the user action is associated with a negative emotion or sentiment, the one or more vehicle features associated with the user action are flagged for review and improvement.

Example 11 may include the method according to example 8 and/or some other example herein, wherein the actions comprise user input received by a human machine interface of the vehicle.

Example 12 may include the method according to example 8 and/or some other example herein, wherein the portion of the real-time images, video, or audio are obtained for a period of time before and after a time associated with the user actions.

Example 13 may include a system, comprising: a human machine interface of a vehicle configured to receive user input while operating the vehicle; a voice command system configured to receive user audio of the user while operating the vehicle; a camera configured to obtain images of the user while operating the vehicle; and a real-time user interaction analysis system having a processor and a memory, the processor executing instructions stored in the memory to: identify any of the user audio or the images of the user associated with an emotion or sentiment; identify the user actions associated with the user audio or the images of the user; and store the user input along with the user audio or the images and the emotion or sentiment.

Example 14 may include the system according to example 13, wherein the processor further executes the instructions to: identify any of the user actions that precede a point in time where the emotion or sentiment of the user was identified; and store the user actions that precede the point in time where the emotion or sentiment of the user was detected.

Example 15 may include the system according to example 13 and/or some other example herein, wherein the processor further executes the instructions to analyze the user audio to identify spoken words of the user that are associated with an emotion or sentiment.

Example 16 may include the system according to example 15 and/or some other example herein, wherein the processor further executes the instructions to analyze the images to identify facial expressions of the user that are associated with an emotion or sentiment.

Example 17 may include the system according to example 16 and/or some other example herein, wherein the processor further executes the instructions to identify the user input associated with the emotion or sentiment by analyzing the spoken words of the user or the facial expressions of the user performed contemporaneously with the user input that is received by the human machine interface.

Example 18 may include the system according to example 13 and/or some other example herein, wherein the user actions comprise any of user input provided into a human machine interface of the vehicle or user utilization of a physical component of the vehicle.

Example 19 may include the system according to example 13 and/or some other example herein, further comprising identifying the user actions that are subsequent to a point in time where the emotion or sentiment of the user was detected.

Example 20 may include the system according to example 19 and/or some other example herein, further comprising storing the user actions that are subsequent to the point in time where the emotion or sentiment of the user was detected along with the user actions that precede a point in time where the emotion or sentiment of the user was detected along with the emotion or sentiment.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
receiving, by a computer comprising at least one processor in communication with at least one memory, at least one image, video, or audio of a user when operating a vehicle;
determining, by the computer and based on the at least one image, video, or audio, an emotion or sentiment of the user when interacting with one or more vehicle features;
determining, by the computer, user actions recorded in a log file within a predetermined period of time preceding a point in time where the emotion or sentiment of the user was detected,
wherein the user actions comprise one or more vehicle interactions with at least one of blind spot identification, shifters, turn signals, windshield wipers, or headlights;
determining, by the computer, an association between at least one of the user actions and the one or more vehicle features with the emotion or sentiment;
augmenting, by the computer, the log file with metadata indicative of the association between the at least one of the user actions and the one or more vehicle features and the emotion or sentiment;
anonymizing the augmented log file while still retaining one or more vehicle attributes including year, model, and relevant option content and software/hardware versions;
transmitting, via network, the anonymized version of the augmented log file to a vehicle designer for review and improvement of the one or more vehicle features; and
automatically updating, based on the emotion or sentiment of the user associated with the user actions, one or more programs associated with the one or more electrical or mechanical components.

2. The method according to claim 1, further comprising storing the user actions, the one or more vehicle features, and the emotion or sentiment.

3. The method according to claim 1, wherein collecting the at least one image, video, or audio comprises continually recording spoken words of the user and continually obtaining video of the user.

4. The method according to claim 3, wherein analyzing the at least one image, video, or audio comprises any of:
evaluating the spoken words for keywords or phrases that are indicative of a positive or negative emotion related to the one or more vehicle features; or
applying facial recognition to determine facial expressions in the video that are indicative of the positive or negative emotion related to the one or more vehicle features.

5. The method according to claim 1, wherein the user actions further comprise any of user input provided into a human machine interface of the vehicle.

6. The method according to claim 1, further comprising identifying the user actions that are subsequent to the point in time where the emotion or sentiment of the user was detected.

7. The method according to claim 6, further comprising storing the user actions that are subsequent to the point in time where the emotion or sentiment of the user was detected.

8. A method, comprising:
collecting in real-time, images, video, or audio of a user related to one or more features of a vehicle;
identifying in real-time, positive or negative emotions or sentiments of the user regarding the one or more vehicle features using the images, video, or audio;
identifying in real-time, user actions associated with the one or more vehicle features of the vehicle that are associated with the positive or negative emotions or sentiments,
wherein the user actions comprise one or more vehicle interactions with at least one of blind spot identification, shifters, turn signals, windshield wipers, or headlights;
storing a portion of the real-time images, video, or audio with the user actions and the one or more vehicle features;
augmenting in real-time, a log file with metadata indicative of the association between the at least one of the user actions and the one or more vehicle features and the emotion or sentiment;
anonymizing the augmented log file while still retaining one or more vehicle attributes including year, model, and relevant option content and software/hardware versions;
transmitting the anonymized version of the augmented log file to a vehicle designer for review and improvement of the one or more vehicle features; and
automatically updating, based on the emotion or sentiment of the user associated with the user actions, one or more programs associated with the one or more electrical or mechanical components.

9. The method according to claim 8, further comprising classifying voice commands from the collected audio as being associated with the positive or negative emotions.

10. The method according to claim 9, wherein when the user actions are associated with a negative emotion or sentiment, the one or more vehicle features associated with the user actions are flagged for review and improvement.

11. The method according to claim 8, wherein the user actions comprise user input received by a human machine interface of the vehicle.

12. The method according to claim 8, wherein the portion of the real-time images, video, or audio are obtained for a period of time before and after a time associated with the user actions.

13. A system, comprising:
a human machine interface of a vehicle configured to receive user input while operating the vehicle;
a voice command system configured to receive user audio of the user while operating the vehicle;
a camera configured to obtain images of the user while operating the vehicle; and
a real-time user interaction analysis system having a processor and a memory, the processor executing instructions stored in the memory to:

identify any of the user audio or the images of the user associated with an emotion or sentiment;

identify user actions associated with the user audio or the images of the user, wherein the user actions comprise one or more vehicle interactions with at least one of blind spot identification, shifters, turn signals, windshield wipers, or headlights;

store the user input along with the user audio or the images and the emotion or sentiment;

augment a log file with metadata indicative of the association between the at least one of the user actions and the one or more vehicle features and the emotion or sentiment;

anonymize the augmented log file while still retaining one or more vehicle attributes including year, model, and relevant option content and software/hardware versions;

transmit the anonymized version of the augmented log file to a vehicle designer for review and improvement of the one or more vehicle features; and automatically updating, based on the emotion or sentiment of the user associated with the user actions, one or more programs associated with the one or more electrical or mechanical components.

14. The system according to claim 13, wherein the processor further executes the instructions to:

identify any of the user actions recorded in the log file within a predetermined period of time preceding a point in time where the emotion or sentiment of the user was identified; and store the user actions that precede the point in time where the emotion or sentiment of the user was detected.

15. The system according to claim 13, wherein the processor further executes the instructions to analyze the user audio to identify spoken words of the user that are associated with the emotion or sentiment.

16. The system according to claim 15, wherein the processor further executes the instructions to analyze the images to identify facial expressions of the user that are associated with the emotion or sentiment.

17. The system according to claim 16, wherein the processor further executes the instructions to identify the user input associated with the emotion or sentiment by analyzing the spoken words of the user or the facial expressions of the user performed contemporaneously with the user input that is received by the human machine interface.

18. The system according to claim 13, wherein the user actions further comprise any of user inputs provided into the human machine interface of the vehicle.

19. The system according to claim 13, further comprising identifying the user actions that are subsequent to a point in time where the emotion or sentiment of the user was detected.

20. The system according to claim 19, further comprising storing the user actions that are subsequent to the point in time where the emotion or sentiment of the user was detected along with the user actions that precede a point in time where the emotion or sentiment of the user was detected along with the emotion or sentiment.

* * * * *